US012316134B2

(12) United States Patent
Kim et al.

(10) Patent No.: US 12,316,134 B2
(45) Date of Patent: May 27, 2025

(54) DEVICE AND METHOD PROVIDING FEEDBACK IN WIRELESS POWER TRANSFER

(71) Applicant: SAMSUNG ELECTRONICS CO., LTD., Suwon-si (KR)

(72) Inventors: Hyunsu Kim, Suwon-si (KR); Sungwoo Moon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 248 days.

(21) Appl. No.: 18/126,657

(22) Filed: Mar. 27, 2023

(65) Prior Publication Data
US 2023/0327490 A1 Oct. 12, 2023

(30) Foreign Application Priority Data
Apr. 11, 2022 (KR) .................. 10-2022-0044642

(51) Int. Cl.
H02J 50/12 (2016.01)
H02J 50/80 (2016.01)

(52) U.S. Cl.
CPC .............. H02J 50/12 (2016.02); H02J 50/80 (2016.02)

(58) Field of Classification Search
CPC .................................. H02J 50/12; H02J 50/80
USPC ....................................................... 307/104
See application file for complete search history.

(56) References Cited

U.S. PATENT DOCUMENTS

| 7,791,311 | B2 | 9/2010 | Sagoo |
| 10,014,723 | B2 | 7/2018 | Huang et al. |
| 10,476,302 | B2 | 11/2019 | Walley et al. |
| 10,998,776 | B2 | 5/2021 | Chen et al. |
| 2018/0212469 | A1 | 7/2018 | Liu et al. |
| 2020/0044491 | A1* | 2/2020 | Qiu .......................... H02J 50/40 |
| 2020/0220392 | A1 | 7/2020 | Pan et al. |
| 2022/0360296 | A1* | 11/2022 | Luo .......................... H02J 50/12 |

FOREIGN PATENT DOCUMENTS

| JP | 6925919 B2 | 8/2021 |
| KR | 10-0736053 B1 | 7/2007 |

OTHER PUBLICATIONS

Datasheet, P9412 30W Wireless Transmitter/Receiver (TRX), Jul. 6, 2021, Renesas Electronics.
MAX77950 WPC/PMA Dual Mode Wireless Power Receiver, 2017, Maxim Integrated, 19-100003; Rev 0; 3/17, www.maximintegrated.com.

(Continued)

Primary Examiner — Daniel Cavallari
Assistant Examiner — Dru M Parries
(74) Attorney, Agent, or Firm — Fish & Richardson P.C.

(57) ABSTRACT

A first device wirelessly receives power from a second device including a second resonance circuit having a resonance frequency. The first device includes: a first resonance circuit having the resonance frequency, a first capacitor connected to the first resonance circuit at a first node, a rectifier configured to rectify an alternating current (AC) voltage apparent at a first node and oscillating at the resonance frequency, and a control circuit connected to the first capacitor, and configured to determine a first period based on feedback information to be provided to the second device, and alternately apply a first voltage and a second voltage higher than the first voltage to the first capacitor for the first period during a normal output mode.

20 Claims, 15 Drawing Sheets

(56) References Cited

OTHER PUBLICATIONS

Roland Van Roy, "Introduction to RE1650 Wireless Power Receiver", Sep. 2015, pp. 1-15, Richtek Technologies Corporation, Hsinchu, Taiwan.
How Wireless Electricity Transmission Works, Wireless Power Consortium.
"The Qi Wireless Power Transfer System Power Class 0 Specification". Wireless Power Consortium, Version 1.2.2 Draft 1, Mar. 2016.

* cited by examiner

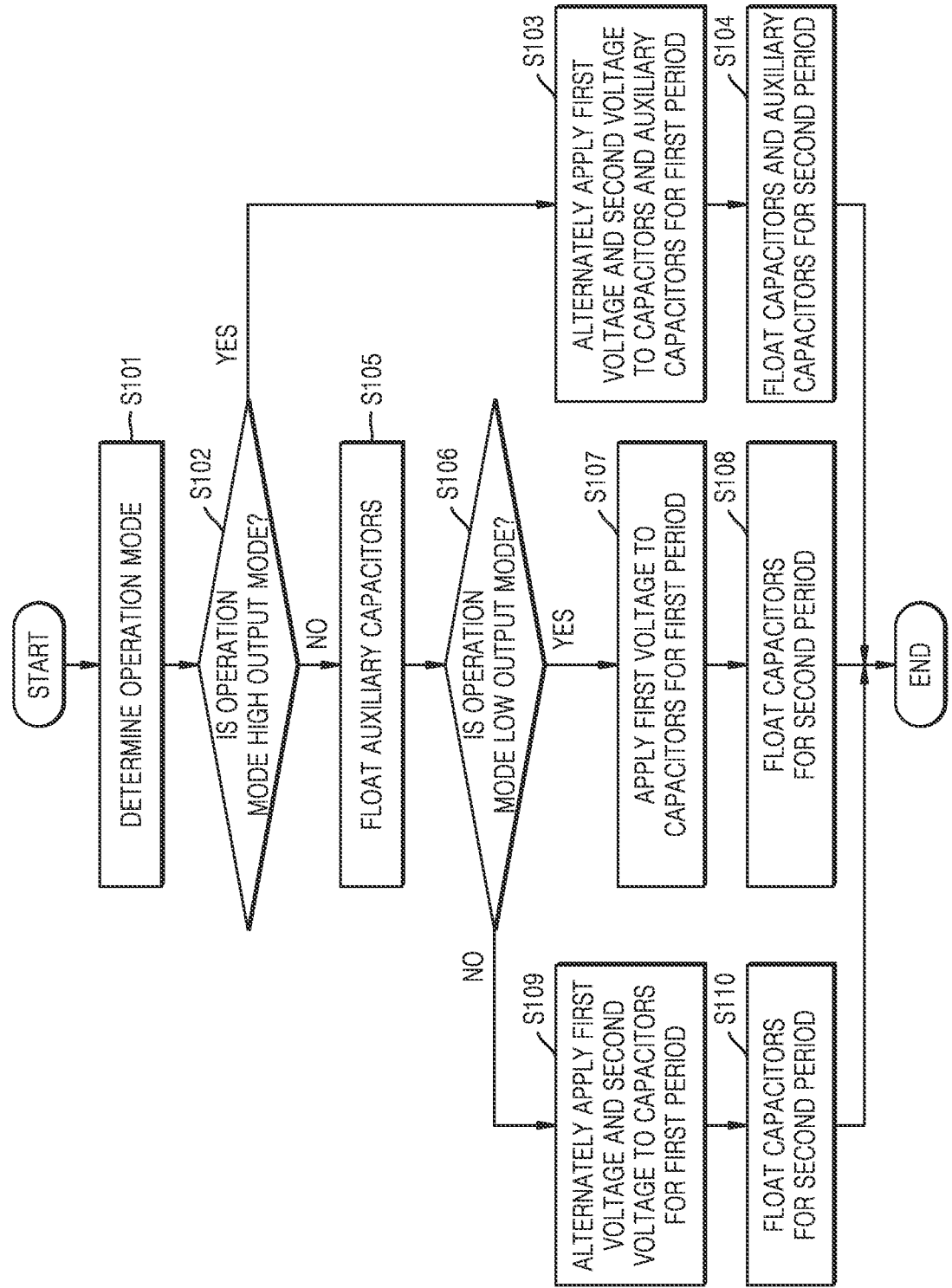

DEVICE AND METHOD PROVIDING FEEDBACK IN WIRELESS POWER TRANSFER

CROSS-REFERENCE TO RELATED APPLICATION

This application claims priority under 35 U.S.C. § 119 to Korean Patent Application No. 10-2022-0044642 filed on Apr. 11, 2022 in the Korean Intellectual Property Office, the subject matter of which is hereby incorporated by reference in its entirety.

BACKGROUND

The inventive concept relates generally to wireless power transfer, and more particularly, to devices and methods providing feedback in wireless power transfer.

The terms "wireless power transfer" or "wireless energy transmission" referred to energy transmission approaches wherein a transmitter wirelessly provides power and a receiver wirelessly receives the power. In circumstances wherein it is difficult to provide wired power connection, or in circumstances wherein wireless power transfer is more convenient than wired power transfer, wireless power transfer may be adopted. Wireless power transfer may use a magnetic field and/or an electromagnetic field between a transmitter and a receiver. The transmitter and the receiver may communicate in relation to wireless power transfer. More particularly, a communication channel between the transmitter and the receiver may be used to communicate feedback from the receiver to the transmitter regarding power provided by the transmitter.

SUMMARY

Embodiments, of the inventive concept provide devices and methods that more efficiently providing feedback from a receiver to a transmitter during wireless power transfer.

According to an aspect of the inventive concept, there is provided a first device wirelessly receiving power from a second device, the first device including;

In some embodiments the inventive concept provides a first device wirelessly receiving power from a second device including a second resonance circuit having a resonance frequency. The first device includes; a first resonance circuit having the resonance frequency, a first capacitor connected to the first resonance circuit at a first node, a rectifier configured to rectify an alternating current (AC) voltage apparent at a first node and oscillating at the resonance frequency, and a control circuit connected to the first capacitor, and configured to determine a first period based on feedback information to be provided to the second device, and alternately apply a first voltage and a second voltage higher than the first voltage to the first capacitor for the first period during a normal output mode.

In some embodiments the inventive concept provides a method performed by a first device wirelessly receiving power from a second device including a second resonance circuit having a resonance frequency. The method includes: rectifying an alternating current (AC) voltage generated by a first resonance circuit having the resonance frequency, determining a first period and a second period based on feedback information to be provided to the second device, alternately applying a first voltage and a second voltage higher than the first voltage to a first capacitor connected to the first resonance circuit for the first period, and floating the first capacitor for the second period.

In some embodiments the inventive concept provides a first device wirelessly receiving power from a second device including a second resonance circuit having a resonance frequency. The first device includes; a first resonance circuit having the resonance frequency, a first capacitor connected to the first resonance circuit at a first node, a second capacitor connected to the first resonance circuit at a second node, a first switch connected to the first capacitor, a second switch connected to the second capacitor, and a controller configured to alternately apply a first voltage and a second voltage higher than the first voltage to the first capacitor and the second capacitor by controlling the at least one of the first switch and the second switch.

BRIEF DESCRIPTION OF THE DRAWINGS

Advantages, benefits and features, as well as the making and use of the inventive concept will be more clearly understood upon consideration of the following detailed description together with the accompanying drawings, in which:

FIG. 11 is a flowchart illustrating a method providing feedback in wireless power transfer according to embodiments of the inventive concept.

DETAILED DESCRIPTION

Throughout the written description and drawings, like reference numbers and labels are used to denote like or similar elements, components, circuits and/or features.

Figure 1:
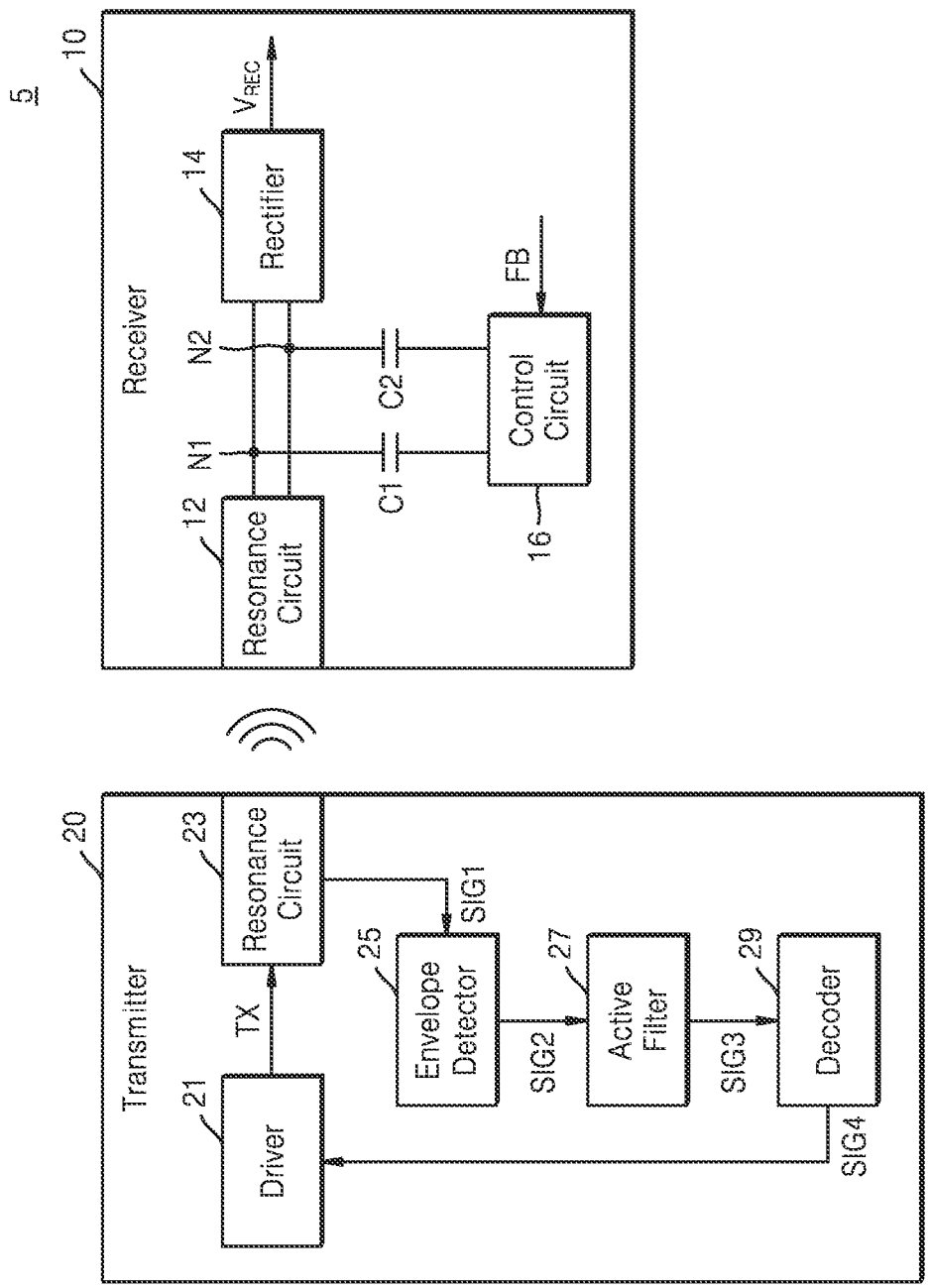
FIG. 1 is a block diagram illustrating a wireless power transfer system according to embodiments of the inventive concept.

FIG. 1 is a block diagram illustrating a wireless power transfer system 5 according to embodiments of the inventive concept. Here, the wireless power transfer system 5 may generally includes a transmitter 20 and a receiver 10. Thus, the transmitter 20 may wirelessly transfer power and the receiver 10 may wirelessly receive power.

Hereinafter, the receiver 10, or a device including the receiver 10 as a component, may be generically referred to as a "first device," and the transmitter 20, or a device including the transmitter 20 as a component, may be generically referred to as a "second device." In this regard, the second device may be any arbitrary device wirelessly providing power. Ready example of the second device include: a wireless charger for a portable device and an electric vehicle wireless charger. Further in this regard, the first device may be any arbitrary device wirelessly receiving power. Ready examples of the first device include; a portable device such as a smartphone, a power tool, an electric personal grooming device, a laptop computer, an electric appliance, a wearable device and an electric vehicle.

Wireless power transfer may be accomplished using a variety of methods. For example, wireless power transfer may occur through two inductors commonly coupled via magnetic induction. Magnetic induction provides relatively high power transfer efficiency, but requires two inductors to be disposed in close proximity to a magnetic field. However, the power transfer efficiency of this approach dramatically decreases with increase in a distance between the two inductors. Alternately, wireless power transfer may be accomplished using resonant inductive coupling. Thus approach uses resonance between two resonance circuits to transfer power and may allows an increased distance between the two resonance circuits relative to the magnetic induction approach.

Hereinafter, certain embodiments of the inventive concept providing wireless power transfer based on the resonant inductive coupling approach will be described, however the scope of the inventive concept is not limited thereto. Of further note, when a battery (see, e.g., element 64c of FIG. 6C or element 64d of FIG. 6D) included in a device including the receiver 10 is charged through wireless power transfer, the wireless power transfer may be generally referred to as "wireless charging."

Referring to FIG. 1, the transmitter 20 may include a driver 21, a resonance circuit 23, an envelope detector 25, an active filter 27, and a decoder 29. The driver 21 may drive the resonance circuit 23 for wireless power transfer through the resonance circuit 23. For example, the driver 21 may provide, to the resonance circuit 23, a transmission signal TX having a resonance frequency of the resonance circuit 23. As described in greater detail hereafter, the driver 21 may generate the transmission signal TX based on (or in response to) a fourth signal SIG4 provided by the decoder 29, and power provided by the resonance circuit 23 may depend on the transmission signal TX.

The resonance circuit 23 of the transmitter 20 may have the same resonance frequency as a resonance circuit 12 of the receiver 10. For example, the resonance circuit 23 may include an inductor and a capacitor connected in series, and when the inductor has an inductance L, and the capacitor has a capacitance C, a resonance frequency fc, may be calculated by Equation 1.

$$f_0 = \frac{1}{2\pi\sqrt{LC}} \quad \text{[Equation 1]}$$

The inductor and the capacitor in the resonance circuit 23 may respectively have an inductance and a capacitance so that the resonance circuit 23 has the same resonance frequency as the resonance circuit 12 of the receiver 10. In some embodiments, the resonance circuit 23 may further include a resistor connected in series to the inductor and the capacitor.

The envelope detector 25 may receive a first signal SIG1 from the resonance circuit 23 and detect an envelope of the first signal SIG1. The receiver 10 may signal to the transmitter 20 through an impedance change. As described below with reference to FIG. 2, the impedance change of the receiver 10 may result in an amplitude change of the first signal SIG1, and the envelope detector 25 may generate a second signal SIG2 by detecting the envelope of the first signal SIG1 and provide the generated second signal SIG2 to the active filter 27.

The active filter 27 may amplify and filter the second signal SIG2 provided from the envelope detector 25. For example, the active filter 27 may increase an amplitude by amplifying the second signal SIG2 corresponding to the envelope of the first signal SIG1 and perform filtering (e.g., band pass filtering) for noise removal. Accordingly, a third signal SIG3 generated by the active filter 27 may correspond to a pulse signal as described below with reference to FIG. 2.

The decoder 29 may generate the fourth signal SIG4 by decoding the third signal SIG3 provided from the active filter 27. In some embodiments, the third signal SIG3 may correspond to a signal modulated by amplitude shift keying, and the decoder 29 may decode the third signal SIG3 to extract information, e.g., feedback information FB, provided by the receiver 10. In some embodiments, the feedback information FB may include information about power provided from the transmitter 20 to the receiver 10, and the decoder 29 may adjust power by generating the fourth signal SIG4 based on the information extracted from the third signal SIG3.

Referring to FIG. 1, the receiver 10 may include the resonance circuit 12, a rectifier 14, a control circuit 16, a first capacitor C1, and a second capacitor C2. The resonance circuit 12 may have the same resonance frequency as the resonance circuit 23 of the transmitter 20 described above. For example, the resonance circuit 12 may include an inductor and a capacitor connected in series, and the inductor and the capacitor may respectively have an inductance and a capacitance to correspond to the same resonance frequency as the resonance frequency of the transmitter 20. As shown in FIG. 1, the resonance circuit 12 may be connected to a first node N1 and a second node N2 and include the inductor and the capacitor connected in series between the first node N1 and the second node N2. In some embodiments, the resonance circuit 12 may further include a resistor connected in series to the inductor or the capacitor between the first node N1 and the second node N2.

The rectifier 14 may be connected to the resonance circuit 12 via the first node N1 and the second node N2. When the transmitter 20 generates an electromagnetic wave oscillating at the resonance frequency for power transfer, a voltage oscillating at the resonance frequency, e.g., an alternating current (AC) voltage, may be generated at the first node N1 and the second node N2 by the resonance circuit 12 of the receiver 10. The rectifier 14 may rectify the AC voltage generated at the first node N1 and the second node N2 and generate a rectified voltage VREc. The rectified voltage VREc may be used to provide power to components in the receiver 10 and may be output to the outside of the receiver 10 and used to provide power to components in a device including the receiver 10. In some embodiments, the rectifier 14 may be a full-wave rectifier or a half-wave rectifier and include diodes.

The first capacitor C1 may be connected to the resonance circuit 12 via the first node N1, and the second capacitor C2 may be connected to the resonance circuit 12 via the second node N2. In addition, the first capacitor C1 and the second capacitor C2 may be connected to the control circuit 16. In some embodiments, the first capacitor C1 and the second capacitor C2 may have the same capacitance. In some embodiments, the first capacitor C1 and the second capacitor C2 may be discrete elements and be mounted on a printed circuit board (PCB) together with the other components of the receiver 10.

The control circuit 16 may apply a voltage to the first capacitor C1 and the second capacitor C2 or float the first capacitor C1 and the second capacitor C2, based on the feedback information FB. When the first capacitor C1 and the second capacitor C2 are floated by the control circuit 16, the AC voltage of the first node N1 and the second node N2 may have a first amplitude at the resonance frequency. When the control circuit 16 applies a voltage to the first capacitor C1 and the second capacitor C2, an impedance of the receiver 10 in terms of the transmitter 20 may include not only the resonance circuit 12 but also the first capacitor C1 and the second capacitor C2. Accordingly, the AC voltage of the first node N1 and the second node N2 may have a second amplitude, and the second amplitude may differ from the first amplitude.

The voltage generated by the resonance circuit 23 of the transmitter 20 may also have an amplitude changed at the resonance frequency, and accordingly, amplitude modulation may be used to provide the feedback information FB to the transmitter 20. Herein, it is assumed that the amplitude at the resonance frequency increases when a voltage is applied to the first capacitor C1 and the second capacitor C2 rather than when the first capacitor C1 and the second capacitor C2 are floated, but it would be understood that a reverse case is also possible. An example of the control circuit 16 is described below with reference to FIG. 5.

The feedback information FB may be information provided from the receiver 10 to the transmitter 20 in wireless power transfer. For example, when power provided by the transmitter 20 is excessive, the receiver 10 may provide the feedback information FB to the transmitter 20 for requesting decreased power. Alternately, when power provided by the transmitter 20 is insufficient, the receiver 10 may provide the feedback information FB to the transmitter 20 requesting increased power. The feedback information FB may be generated internal to the receiver 10 or external to receiver 10. As described above, the feedback information FB may be provided from the receiver 10 to the transmitter 20 using a channel for wireless power transfer. Such in-band communication (e.g., power line communication) may allow omission of an additional communication channel for the feedback information FB, thereby reducing costs associated with the receiver 10 and the transmitter 20 and also improving operating efficiency of the receiver 10 and the transmitter 20.

In order for the transmitter 20 to accurately receive the feedback information FB, it may be necessary to adjust an amplitude change amount (e.g., DEP of FIG. 2) in amplitude modulation. For example, when the wireless power transfer system 5 is exposed to a relatively noisy environment, a distance between the transmitter 20 and the receiver 10 increases, or a change in power transmission/reception occurs due to an internal state of the transmitter 20 and/or an internal state of the receiver 10. Accordingly, an increased amplitude change amount may be required in amplitude modulation in order for the transmitter 20 to successfully identify the feedback information FB. In addition, when an amplitude change amount increases, the efficiency of wireless power transfer may decrease. Accordingly, it may be necessary to decrease the amplitude change amount in a normal state. Herein, an amplitude change amount in amplitude modulation may simply be referred to as a "depth."

In order to adjust a depth in amplitude modulation, capacitances of the first capacitor C1 and the second capacitor C2 may be adjusted, but in this case, additional components (e.g., additional capacitors) may be required to provide variable capacitance. When such additional components are discrete elements, both the cost and an required implementation area of the receiver 10 may increase, and also pin-out of the control circuit 16 may increase.

As described hereafter in some additional detail, the control circuit 16 may apply two or more different voltages (e.g., a first voltage and a second voltage higher than the first voltage) to the first capacitor C1 and the second capacitor C2. Accordingly, a depth of amplitude modulation may efficiently increase or be more efficiently adjusted. As a result, a communication configuration transferring the feedback information FB may be adaptively adjusted, the feedback information FB may be stably provided to the transmitter 20 under a wider range of circumstances, and reliability of the wireless power transfer system 5 may be improved. In addition, components required to adjusting a depth of amplitude modulation may be omitted, and both implementation area and cost associated with the receiver 10 (or a device including the receiver 10) may be reduced.

Figure 2:
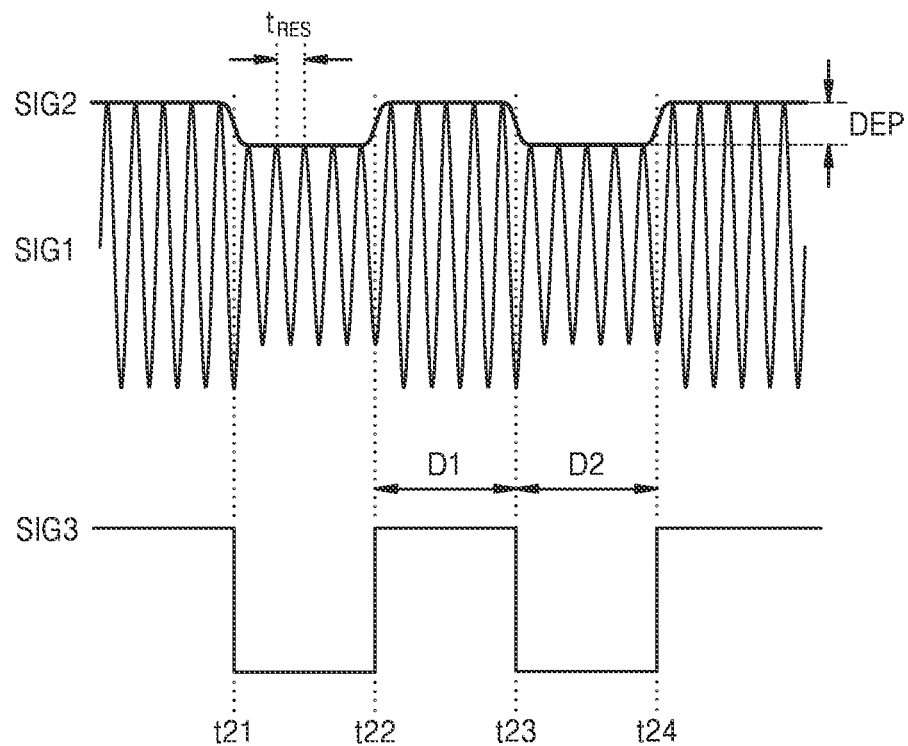
FIG. 2 is a timing diagram further illustrating signal relationships in wireless power transfer according to embodiments of the inventive concept.

FIG. 2 is a timing diagram further illustrating signal relationships in wireless power transfer according to embodiments of the inventive concept. More particularly, the timing diagram of FIG. 2 illustrates relationships between the first signal SIG1, the second signal SIG2, and the third signal SIG3 of the transmitter 20 of FIG. 1.

Referring to FIGS. 1 and 2, the first signal SIG1 provided from the resonance circuit 23 may oscillate at the resonance frequency (e.g., $1/t_{RES}$). In addition, an amplitude of the first signal SIG1 may vary in relation to a change in the impedance of the receiver 10. The second signal SIG2 generated by the envelope detector 25 may correspond to the envelope of the first signal SIG1. As shown in FIG. 2, the second signal SIG2 may vary in relation to a change in the amplitude of the first signal SIG1, and an amplitude of the second signal SIG2 may correspond to a change amount (e.g., a depth DEP) of the amplitude of the first signal SIG1.

The third signal SIG3 may be generated by the active filter 27 by amplifying and filtering the second signal SIG2. Accordingly, as shown in FIG. 2, the third signal SIG3 may have a low level in a period between a time point t21 and a time point t22 and a period between a time point t23 and a time point t24 and have a high level in a period between the time point t22 and the time point t23. Further, as hereafter described with reference to FIG. 3, levels of the third signal SIG3 may indicate bits, and the decoder 29 may extract the feedback information FB by decoding the bits.

Referring to FIG. 2, a period during which the amplitude of the first signal SIG1 is relatively high may be referred to as a first period D1, and a period during which the amplitude of the first signal SIG1 is relatively low may be referred to as a second period D2. Accordingly, the control circuit 16 may apply a voltage to the first capacitor C1 and the second capacitor C2 for the first period D1 and float the first capacitor C1 and the second capacitor C2 for the second period D2.

Figure 3:
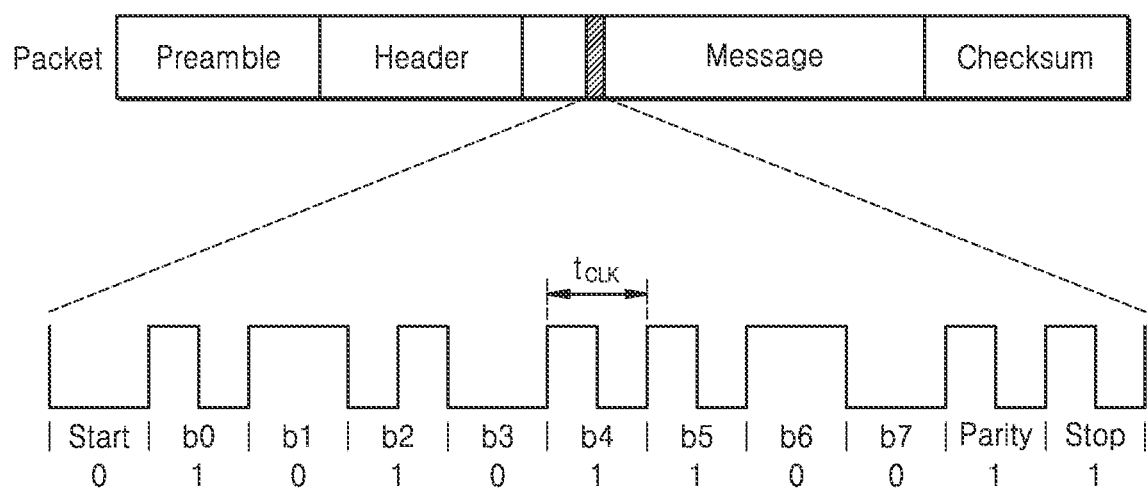
FIG. 3 is a conceptual diagram illustrating an exemplary packet that may be used to provide feedback during wireless power transfer according to embodiments of the inventive concept.

FIG. 3 is a conceptual diagram illustrating an exemplary packet that may be used for feedback during wireless power transfer according to embodiments of the inventive concept. Assuming a more particular example, FIG. 3 shows the structure (or format) of a packet communicated from the receiver 10 to the transmitter 20 in order to communicate feedback information FB. However, the packet of FIG. 3 is merely illustrative, and those skilled in the art will appreciate that feedback information may be variously communicated between the receiver 10 and the transmitter 20.

Referring to FIGS. 1 and 3, the packet may generally include a preamble field, a header field, a message field, and a checksum field. The preamble field may inform of start of the packet and provide synchronization, the header field may indicate a type of the packet, the message field may include a payload, and the checksum field may include a value for verifying integrity of the packet.

The packet may include a series of bytes, and one byte may include a start bit, first to eighth bits b0 to b7, a parity bit, and a stop bit, as shown in FIG. 3. The start bit may indicate start of a byte, the first to eighth bits b0 to b7 may correspond to data, the parity bit may have a value for verifying integrity of the first to eighth bits b0 to b7, and the stop bit may indicate end of the byte. A value of a bit may be determined according to whether signal transition (e.g., a change in a level) occurs in a period, e.g., a bit period tax, corresponding to one bit. For example, the first bit b0, in which signal transition occurs, may have a value of 1, whereas the second bit, in which signal transition does not occur, may have a value of 0. Accordingly, the first period D1 and the second period D2 of FIG. 2 may be shortened to transmit the value of 1 (D1=D2=$t_{CLK}$/2) and enlarged to transmit the value of 0 (D1=D2=$t_{CLK}$).

Figure 4A:
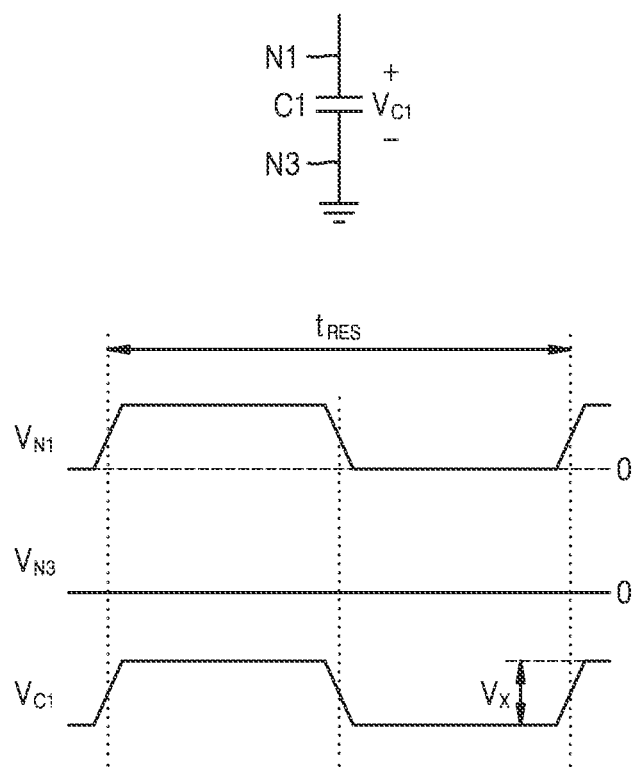
FIGS. 4A and 4B are respective circuit diagrams and associated waveform diagrams illustrating examples of amplitude modulation that may be used in relation to embodiments of the inventive concept.
Figure 4B:
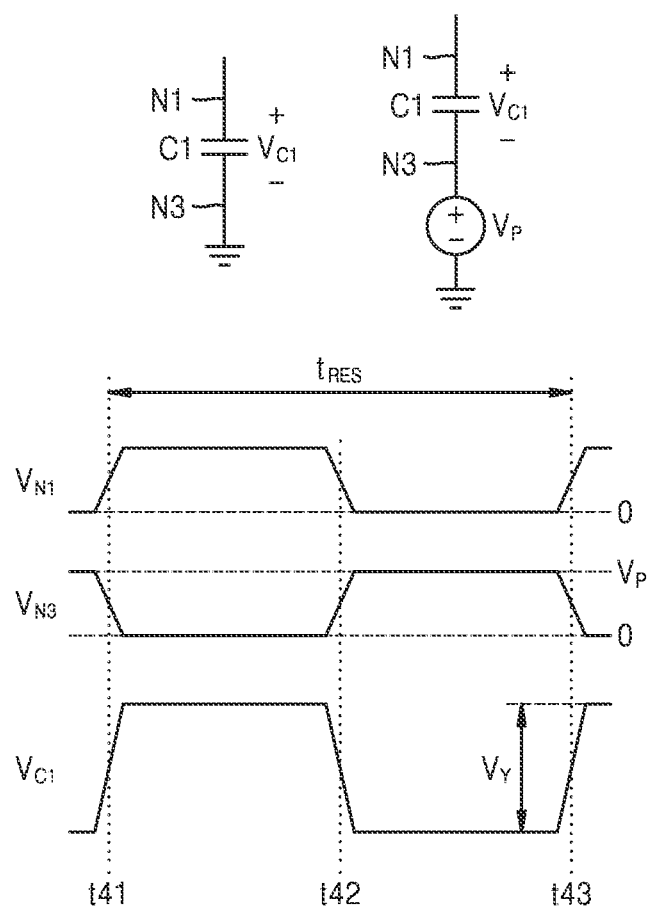

FIGS. 4A and 4B are respective circuit diagrams and associated waveform diagrams illustrating examples of amplitude modulation that may be used in relation to embodiments of the inventive concept. Assuming a more particular example, FIGS. 4A and 4B show voltages $V_{N1}$ and $V_{N3}$ of the first node N1 and a third node N3 connected to the first capacitor C1 of FIG. 1 and a voltage $V_{C1}$ of the first capacitor C1 in an amplitude increasing period, e.g., the first period D1. Thus, in FIGS. 4A and 4B, the third node N3 may correspond to a node to which the first capacitor C1 and the control circuit 16 of FIG. 1 are connected.

Referring to FIGS. 3 and 4A, the voltage $V_{N1}$ of the first node N1 may oscillate at the resonance frequency (e.g., 1/$t_{RES}$). As shown in FIG. 4A, when a ground potential is applied to the third node N3 to increase an amplitude, the voltage $V_{C1}$ of the first capacitor C1 may be the same as the voltage $V_{N1}$ of the first node N1 and may have an amplitude $V_X$, as shown in FIG. 4A. In FIG. 4A, a charge $Q_a$ stored and discharged in the first capacitor C1 may be calculated by Equation 2 when the capacitance of the first capacitor C1 is C1.

$$Q_a = C_1 * V_x \qquad \text{[Equation 2]}$$

A capacitive load may be generated in a receiver due to the charge calculated by Equation 2. And accordingly, an impedance of the receiver may vary.

Referring to FIGS. 3 and 4B, the voltage $V_{N1}$ of the first node N1 may oscillate at the resonance frequency (e.g., 1/$t_{RES}$). In contrast to the example of FIG. 4A in which the ground potential is constantly applied to the third node N3, in the example of FIG. 4B, different voltages may alternately be applied to the third node N3. For example, as shown in FIG. 4B, in a cycle $t_{RES}$ of the voltage $V_{N1}$ of the first node N1, the ground potential may be applied to the third node N3 for a positive half cycle of the voltage $V_{N1}$ of the first node N1, e.g., a time point t41 to a time point t42, and a positive voltage $V_P$ may be applied to the third node N3 for a negative half cycle of the voltage $V_{N1}$ of the first node N1, e.g., the time point t42 to a time point t43. Accordingly, the voltage $V_{C1}$ of the first capacitor C1, which corresponds to a difference between the voltage $V_{N1}$ of the first node N1 and the voltage $V_{N3}$ of the third node N3, may have an amplitude $V_Y$, and the amplitude $V_Y$ may be greater than the amplitude $V_X$ of FIG. 4A by a magnitude of the positive voltage $V_P$. In FIG. 4B, a charge $Q_b$ stored and discharged in the first capacitor C1 may be calculated by Equation 3 when the capacitance of the first capacitor C1 is $C_1$.

$$Q_b = C_1 * V_Y \qquad \text{[Equation 3]}$$

A capacitive load may be generated in the receiver due to the charge calculated by Equation 3, and accordingly, the impedance of the receiver may vary. Because the amplitude $V_Y$ of FIG. 4B is greater than the amplitude $V_X$ of FIG. 4A, the charge $Q_b$ of Equation 3 may be greater than the charge $Q_a$ of Equation 2, and accordingly, a change in the impedance of the receiver may be greater in the example of FIG. 4B than in the example of FIG. 4A.

As described above with reference to FIG. 4B, the control circuit 16 of FIG. 1 may alternately apply different voltages (e.g., the first voltage and the second voltage higher than the first voltage) to the first capacitor C1 and the second capacitor C2, thereby increasing a depth of amplitude modulation. That is, in the illustrated example of FIG. 4B, the first voltage may be the ground potential and the second voltage may be the positive voltage $V_P$. The voltage of the first node N1 and the voltage of the second node N2 in FIG. 1 may have different polarities, and accordingly, the control circuit 16 may apply the second voltage to the second capacitor C2 while applying the first voltage to the first capacitor C1 and apply the first voltage to the second capacitor C2 while applying the second voltage to the first capacitor C1.

In some embodiments, the control circuit 16 may control the first capacitor C1 and the second capacitor C2 in relation to an operational mode. For example, the control circuit 16 may alternately apply the first voltage and the second voltage to the first capacitor C1 and the second capacitor C2, as described above with reference to FIG. 4B, during a normal (or nominal) output mode, yet apply the first voltage to the first capacitor C1 and the second capacitor C2, as described in relation to FIG. 4A, during a low-output mode.

Figure 5:
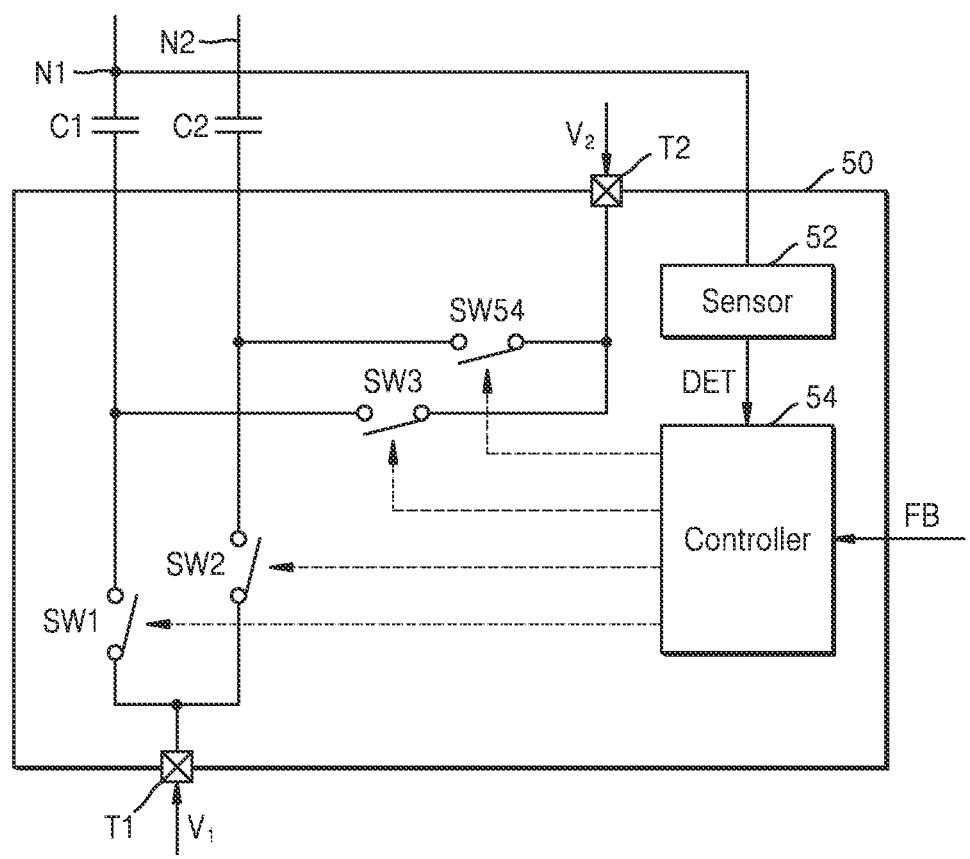
FIG. 5 is a block diagram illustrating in one example a control circuit according to embodiments of the inventive concept.

FIG. 5 is a block diagram further illustrating in one example of a control circuit 50 according to embodiments of the inventive concept.

Referring to FIGS. 1 and 5, the control circuit 50 of FIG. 5 may correspond in some embodiments to the control circuit 16 of FIG. 1. Here, the first capacitor C1 and the second capacitor C2 may be respectively connected to the first node N1 and the second node N2, wherein the control circuit 50 may be used to control operation of the first capacitor C1 and the second capacitor C2 in response to the feedback information FB. For example, as shown in FIG. 5, the control circuit 50 may include a first switch SW1, a second switch SW2, a third switch SW3, a fourth switch SW4, a sensor 52, and a controller 54. In addition, the control circuit 50 may include a first terminal T1 through which a first voltage $V_1$ is received, and a second terminal T2 through which a second voltage $V_2$ is received, wherein the second voltage $V_2$ may be higher than the first voltage $V_1$ (i.e., $V_2 > V_1$).

Those skilled in the art will appreciate that each of the first switch SW1, the second switch SW2, the third switch SW3, and the fourth switch SW4 may have an arbitrary structure capable of electrically connecting opposing ends thereof when turned ON and further capable of electrically disconnecting opposing ends when turned OFF. In some embodiments, however, each of the first switch SW1, the second switch SW2, the third switch SW3, and the fourth switch SW4 may include an N-channel field effect transistor (NFET) and/or a P-channel field effect transistor (PFET) controlled by the controller 54.

One or more of the first switch SW1, the second switch SW2, the third switch SW3, and the fourth switch SW4 may be variously connected (indicated by dotted lines) to the first capacitor C1 or the second capacitor C2 under the control of the controller 54. Here, for example, the first switch SW1 may be connected between the first terminal T1 receiving the first voltage $V_1$ and the first capacitor C1 and may be used to selectively apply the first voltage $V_1$ to the first capacitor C1. The second switch SW2 may be connected between the first terminal T1 and the second capacitor C2 and may be used to selectively apply the first voltage $V_1$ to the second capacitor C2. The third switch SW3 may be connected between the second terminal T2 receiving the second voltage $V_2$ and the first capacitor C1 and may be used to selectively apply the second voltage $V_2$ to the first capacitor C1. The fourth switch SW4 may be connected between the second terminal T2 and the second capacitor C2 and may be used to selectively apply the second voltage $V_2$ to the second capacitor C2.

The first capacitor C1 may electrically float when both the first switch SW1 and the third switch SW3 are turned OFF. The second capacitor C2 may float when both the second switch SW2 and the fourth switch SW4 are turned OFF.

The sensor 52 may be connected to the first node N1 and may be configured to detect a phase of an AC voltage by detecting a voltage and/or a current apparent at the first node N1. Consistent with FIG. 4B, in order to apply the first voltage $V_1$ (or the second voltage $V_2$) to the first capacitor C1 (or the second capacitor C2) for a positive half cycle of the AC voltage and apply the second voltage $V_2$ (or the first voltage $V_1$) to the first capacitor C1 (or the second capacitor C2) for a negative half cycle of the AC voltage, the sensor 52 may detect the phase of the AC voltage. For example, the sensor 52 may compare the voltage of the first node N1 with a threshold voltage, generate an activated detection signal DET for a period in which the voltage of the first node N1 is greater than or equal to the threshold voltage (e.g., the positive half cycle of the AC voltage), and generate an inactivated detection signal DET for a period in which the voltage of the first node N1 is less than the threshold voltage (e.g., the negative half cycle of the AC voltage). Alternately or additionally, the sensor 52 may detect a voltage and/or a current of the second node N2 or detect the voltages and/or the currents of the first node N1 and the second node N2.

The controller 54 may control the first switch SW1, the second switch SW2, the third switch SW3, and the fourth switch SW4 in response to the feedback information FB and the detection signal DET. For example, the controller 54 may encode the feedback information FB and identify the first period D1 and the second period D2 in relation to an encoded bit. The controller 54 may control the first switch SW1, the second switch SW2, the third switch SW3, and the fourth switch SW4 in such a manner so as to alternately apply the first voltage $V_1$ and the second voltage $V_2$ to the first capacitor C1 and the second capacitor C2 for the first period D1 and control (e.g., turn OFF) the first switch SW1, the second switch SW2, the third switch SW3, and the fourth switch SW4 to float the first capacitor C1 and the second capacitor C2 for the second period D2.

Hence, the controller 54 may identify the positive half cycle and the negative half cycle of the AC voltage in response to the detection signal DET in the first period D1. The controller 54 may turn ON the first switch SW1 and the fourth switch SW4 and turn OFF the second switch SW2 and the third switch SW3 for the positive half cycle of the AC voltage (e.g., from the time point t41 to the time point t42 of FIG. 4B). In addition, the controller 54 may turn OFF the first switch SW1 and the fourth switch SW4 and turn ON the second switch SW2 and the third switch SW3 for the negative half cycle of the AC voltage (e.g., from the time point t42 to the time point t43 of FIG. 4B).

The controller 54 may be referred to an optional target configured to operate as described above. For example, the controller 54 may include a programmable component, such as a central processing unit (CPU), a reconfigurable component, such as a field programmable gate array (FPGA), and/or a component, such as an intellectual property (IP) core, designed to perform a designated function.

FIGS. 6A, 6B, 6C, and 6D (hereafter collectively, "FIGS. 6A to 6D") are respective block diagram illustrating various embodiments that may be configured to generate the second voltage described above. That is, the control circuit 16 of FIG. 1 may alternately apply the first voltage and the second voltage to the first capacitor C1 and the second capacitor C2, wherein the second voltage is higher than the first voltage. With respect to the embodiments of FIGS. 6A to 6D, the first voltage is assumed to be ground potential and the second voltage is assumed to be a positive voltage higher than the ground potential.

Figure 6A:
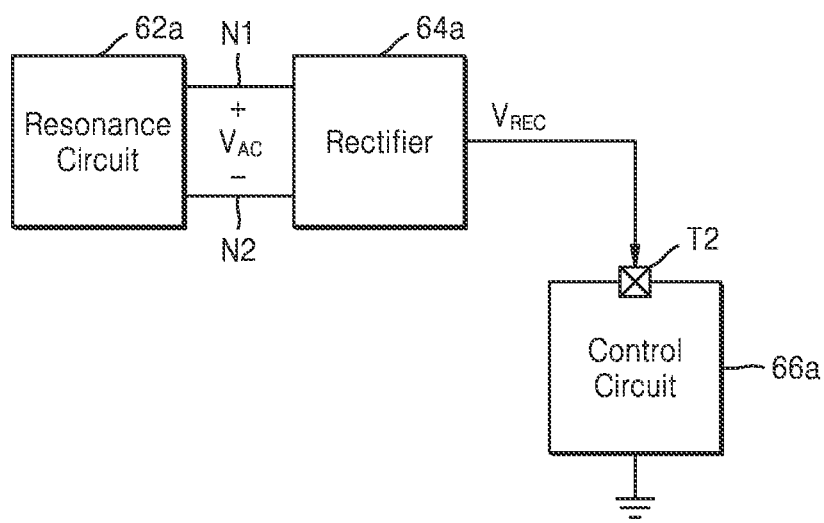
FIGS. 6A, 6B, 6C and 6D are respective block diagram variously illustrating possible embodiments that may be used to generate the second voltage.

Referring to FIG. 6A, the second voltage may correspond to a rectified voltage VREc. For example, as shown in FIG. 6A, a receiver 60a may include a resonance circuit 62a, a rectifier 64a, and a control circuit 66a. The resonance circuit 62a may generate an AC voltage VAc between the first node N1 and the second node N2. The rectifier 64a may generate the rectified voltage VREc by rectifying the AC voltage VAc, and the rectified voltage VREc may be provided to the second terminal T2 of the control circuit 66a.

Figure 6B:
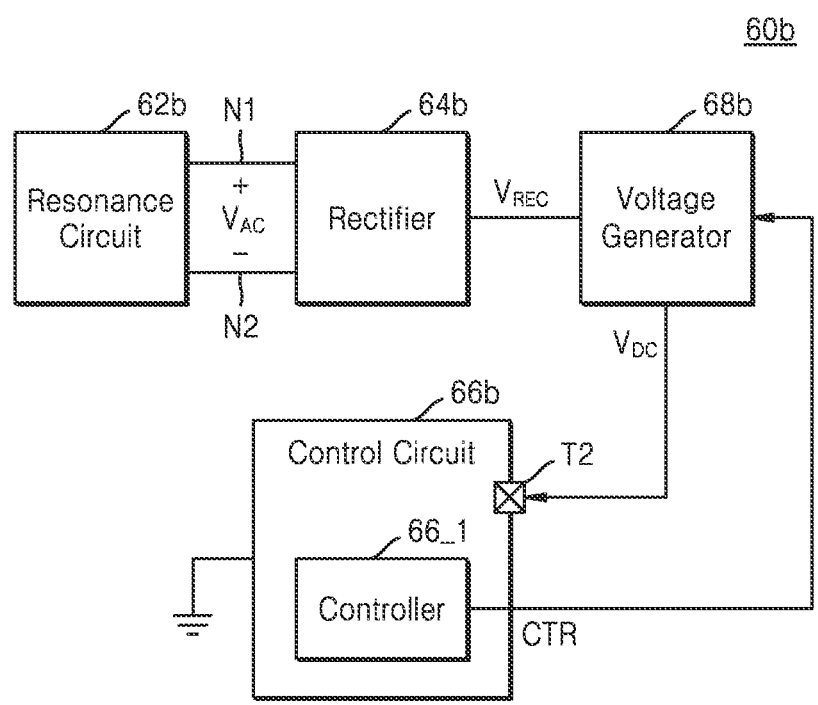

Referring to FIG. 6B, the second voltage may correspond to a direct current (DC) voltage $V_{DC}$ generated from the rectified voltage VREc. For example, as shown in FIG. 6B, a receiver 60b may include a resonance circuit 62b, a rectifier 64b, and a control circuit 66b and may further include a voltage generator 68b. The voltage generator 68b may receive the rectified voltage VREc from the rectifier 64b and generate the DC voltage $V_{DC}$ from the rectified voltage VREc. The DC voltage $V_{DC}$ may be provided to the second terminal T2 of the control circuit 66b. The voltage generator 68b may receive a control signal CTR from the control circuit 66b and adjust a magnitude of the DC voltage $V_{DC}$, in response to the control signal CTR. For example, as described in relation to FIG. 4B, a depth of amplitude modulation may vary in relation to a magnitude of the DC voltage $V_{DC}$. A controller 66_1 included in the control circuit 66b may adjust the magnitude of the DC voltage $V_{DC}$ by the control signal CTR according to an operation mode (or operating state) of wireless power transfer in order to adjust the depth of amplitude modulation. In some embodiments, the voltage generator 68b may include a voltage regulator (e.g., a low dropout (LDO) regulator) and a reference voltage of the voltage regulator may be regulated by the control signal CTR.

Figure 6C:
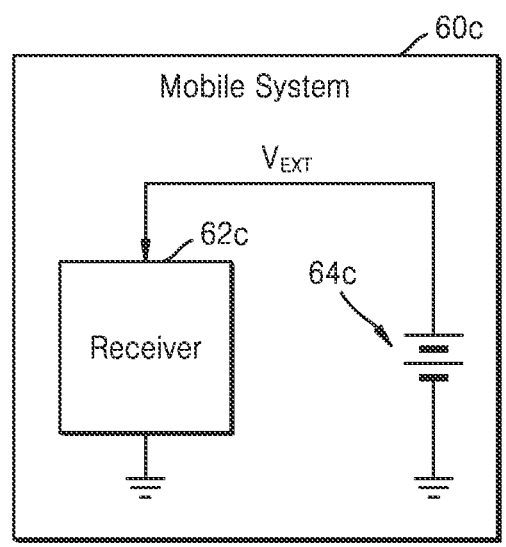

Referring to FIG. 6C, the second voltage may correspond to an external voltage $V_{EXT}$ independent of an AC voltage. For example, as shown in FIG. 6C, a mobile system 60c including a receiver 62c may include a battery 64c as a power source, and the battery 64c may provide the external voltage $V_{EXT}$, which is independent to the AC voltage generated by the receiver 62c, to the receiver 62c. The receiver 62c may receive the external voltage $V_{EXT}$ from the battery 64c, and a control circuit included in the receiver 62c may use the external voltage $V_{EXT}$ as the second voltage. The mobile system 60c may include, for example, a portable device such as a smartphone, a power tool, a personal appliance, a laptop computer, a wearable device, an electric vehicle, etc.

Figure 6D:
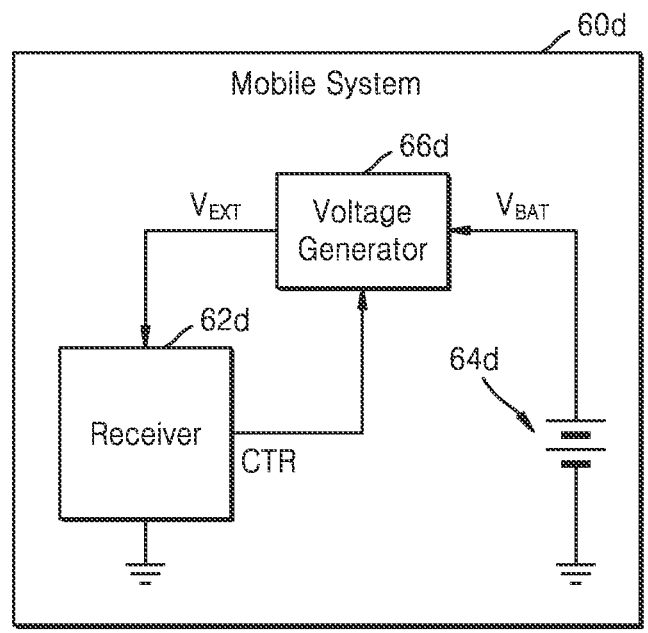

Referring to FIG. 6D, the second voltage may correspond to the external voltage $V_{EXT}$ independent to an AC voltage, wherein the external voltage $V_{EXT}$ is regulatable. For example, as shown in FIG. 6D, a mobile system 60d may include a receiver 62d and a battery 64d and may further include a voltage generator 66d. The voltage generator 66d may generate the external voltage $V_{EXT}$ from a battery voltage VBAT provided from the battery 64d and adjust a magnitude of the external voltage $V_{EXT}$ in response to the control signal CTR received from the receiver 62d. In some embodiments, the voltage generator 66d may be included in the receiver 62d, as illustrated in FIG. 6B. Accordingly, the control signal CTR need not be exposed outside of the receiver 62d.

Figure 7:
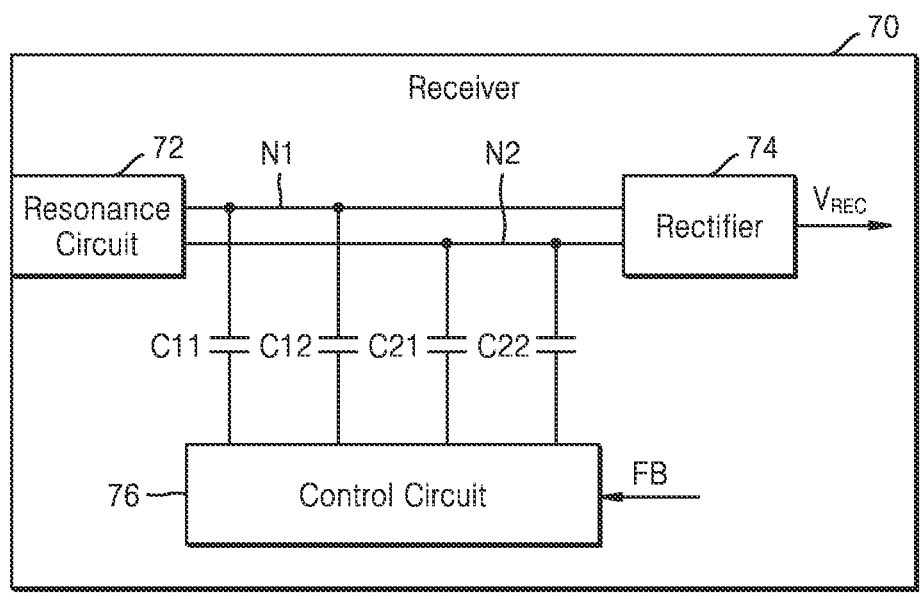
FIG. 7 is a block diagram illustrating a receiver according to embodiments of the inventive concept.

FIG. 7 is a block diagram illustrating in one example a receiver 70 according to embodiments of the inventive concept. As shown in FIG. 7, the receiver 70 may include a resonance circuit 72, a rectifier 74, a control circuit 76, and first and second capacitors C11, C12, C21, and C22.

Referring to FIGS. 1 and 7, the greater the capacitance added to the first node N1 and the second node N2, the greater an amplitude of the AC voltage. Accordingly, to increase a depth of amplitude modulation, the capacitance added to the first node N1 and the second node N2 may be adjusted. For example, as shown in FIG. 7, the two first capacitors C11 and C12 may be connected to the first node N1, and the two second capacitors C21 and C22 may be connected to the second node N2. During a normal output mode, the control circuit 76 may float one (e.g., C12) of the two first capacitors C11 and C12 and float one (e.g., C22) of the two second capacitors C21 and C22. However, during a high output mode, the control circuit 76 may alternately apply the first voltage and the second voltage to both the two first capacitors C11 and C12 in common, and alternately apply the first voltage and the second voltage to both the two second capacitors C21 and C22 in common. Herein, the capacitors (e.g., C12 and C22) that float during the normal output mode may be referred to as "auxiliary capacitors."

The embodiment of FIG. 7 assumes two (2) capacitors connected to a node, however the inventive concept is not limited thereto. For example, the receiver 70 may include three or more capacitors connected to the first node N1 and three or more capacitors connected to the second node N2, wherein the control circuit 76 may variably control such capacitors in accordance with an operation mode.

Figure 8:
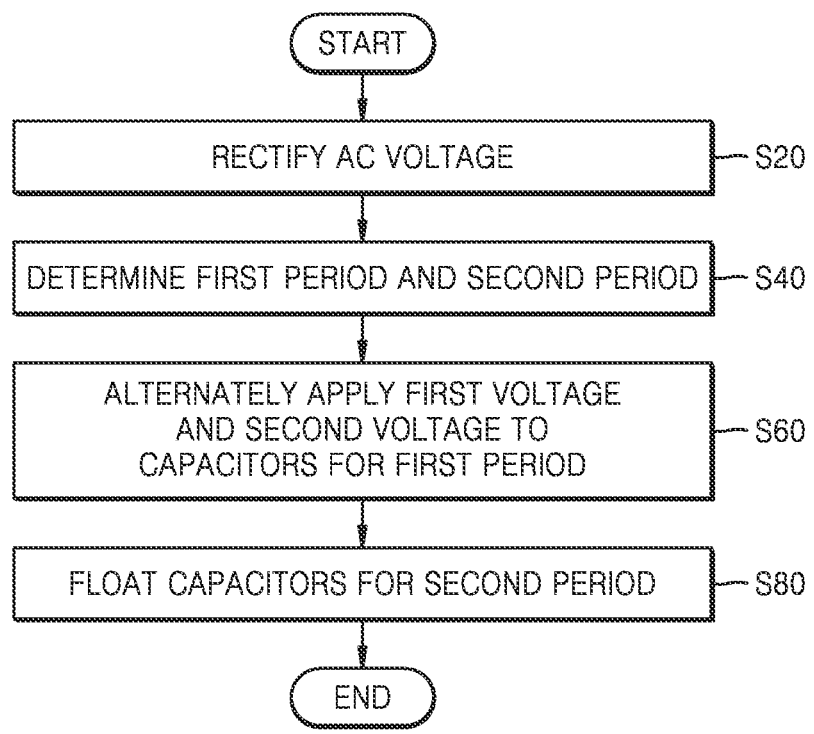
FIG. 8 is a flowchart illustrating in one example a method providing feedback in wireless power transfer according to embodiments of the inventive concept.

FIG. 8 is a flowchart illustrating in one example a method of providing feedback in wireless power transfer according to embodiments of the inventive concept. Here, it is assumed that the method of FIG. 8 is performed by the wireless power transfer system of FIG. 1.

Referring to FIGS. 1 and 8, an AC voltage is rectified (S20). For example, the resonance circuit 12 may generate, at the first node N1 and the second node N2, the AC voltage oscillating at a resonance frequency resulting from an electromagnetic wave induced by the transmitter 20. The rectifier 14 may generate the rectified voltage VREC by rectifying the AC voltage. As described above, the rectified voltage VREC may provide power to components of the receiver 10 and components of a device including the receiver 10.

The first period D1 and the second period D2 may be determined (S40). As described above with reference to FIG. 2, the first period D1 may be a period during which an amplitude of the AC voltage is relatively high (e.g., a period corresponding to the high level in amplitude modulation). In contrast, the second period D2 may be a period during which the amplitude of the AC voltage is relatively low (e.g., a period corresponding to the low level in amplitude modulation). The control circuit 16 may be used to determine the first period D1 and the second period D2 in response to the feedback information FB. One example of the method step S40 will be described hereafter in some additional detail with reference to FIG. 9.

The first voltage and the second voltage may be alternately applied to capacitors in relation to the first period D1 (S60). For example, the control circuit 16 may alternately apply the first voltage and the second voltage instead of applying a constant voltage (e.g., ground potential) to the first capacitor C1 and the second capacitor C2 for the first period D1. Accordingly, as described above withe reference to FIGS. 4A and 4B, the voltage of the first capacitor C1 and the voltage of the second capacitor C2 may have a higher amplitude than when the constant voltage was applied thereto, and as a result, a depth of amplitude modulation may increase. The control circuit 16 may detect a phase of the AC voltage and alternately provide the first voltage and the second voltage based on the detected phase. One example of the method step S60 will be described hereafter in some additional detail with reference to FIG. 10.

The capacitors may float for the second period D2 (S80). For example, the control circuit 16 may float the first capacitor C1 and the second capacitor C2 for the second period D2. The amplitude of the AC voltage may decrease in the second period D2 than in the first period D1 due to the floated first capacitor C1 and second capacitor C2, and accordingly, the low level of amplitude modulation may be generated.

Figure 9:
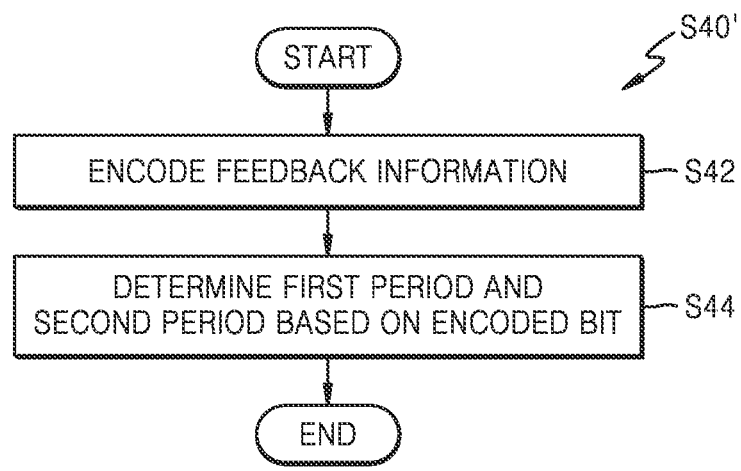
FIGS. 9 and 10 are respective flowcharts further illustrating steps in various methods of providing feedback in wireless power transfer according to embodiments of the inventive concept.

FIG. 9 is a flowchart further illustrating in one example a method of providing feedback in wireless power transfer according to example embodiments of the inventive concept. More particularly, FIG. 9 illustrates an example (S40') of the method step S40 in the method of FIG. 8, wherein the first period D1 and the second period D2 are determined.

Referring to FIGS. 1 and 9, the feedback information FB may be encoded (S42). For example, the control circuit 16 may generate at least one packet, as described above with reference to FIG. 3, by encoding the feedback information FB. The control circuit 16 may determine values of fields of a packet based on the feedback information FB and generate a packet including fields corresponding to the determined values. A packet may include a series of bytes, and one byte may include a series of bits each indicating 1 or 0 in the bit period $t_{CLK}$.

Then, the first period D1 and the second period D2 may be determined in relation to (or based on) an encoded bit (S44). For example, as described above with reference to FIG. 3, if transition occurs in the bit period $t_{CLK}$, a signal may indicate 1, otherwise if transition does not occur in the bit period $t_{CLK}$, a signal may indicate 0. Accordingly, the control circuit 16 may determine the first period D1 and the second period D2 according to values in bit periods respectively corresponding to encoded bits generated by encoding the feedback information FB in method step S42. For example, when the encoded bits are generated as shown in FIG. 3, the first period D1 and the second period D2 having a shortened length (e.g., tax/2) in the bit period $t_{CLK}$ corresponding to the third bit b2 may be determined, and it may be determined that the first period D1 follows the second period D2. In addition, the second period D2 having an enlarged length (e.g., tax) in the bit period tax corresponding to the fourth bit b3 may be determined. As described above with reference to FIG. 8, the control circuit 16 may control the first capacitor C1 and the second capacitor C2 according to the determined first period D1 and second period D2.

Figure 10:
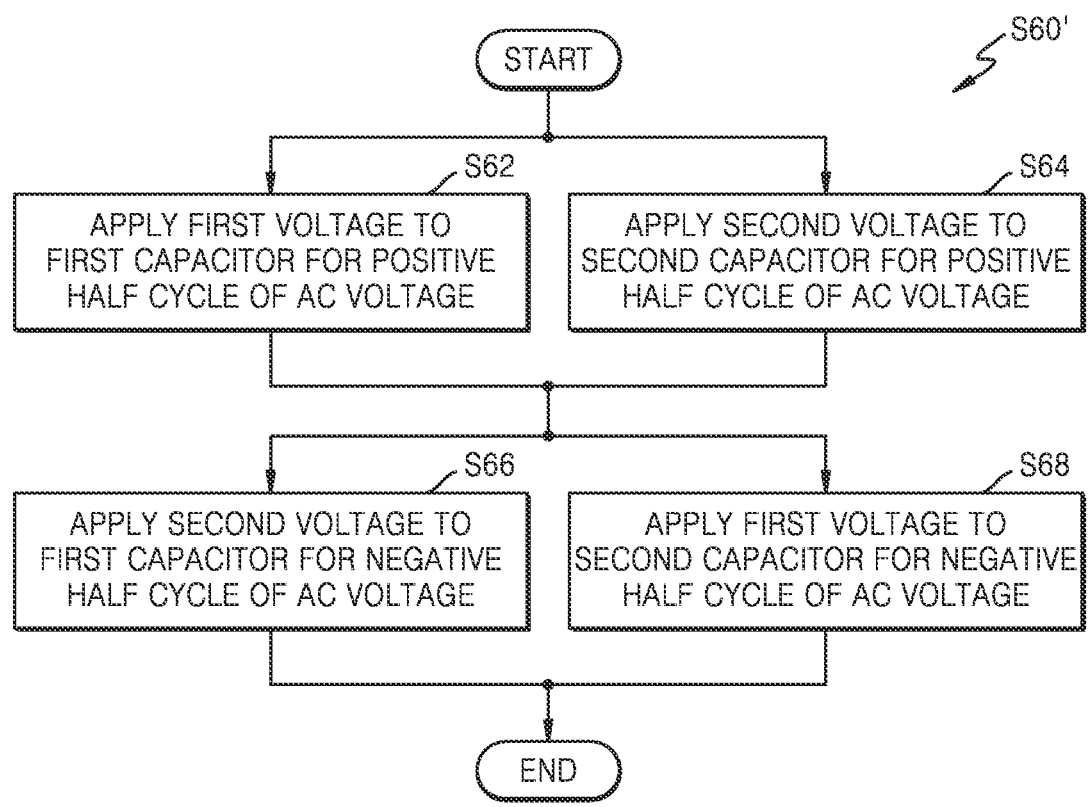

FIG. 10 is a flowchart illustrating in one example a method of providing feedback in wireless power transfer according to embodiments of the inventive concept. More particularly, FIG. 10 illustrates in one example (S60') the method step S60 in the method of FIG. 8, wherein the first voltage and the second voltage are alternately applied to capacitors for the first period D1.

Referring to FIGS. 1 and 10, the first voltage may be applied to the first capacitor C1 for a positive half cycle of an AC voltage (S62), the second voltage may be applied to the second capacitor C2 for the positive half cycle of the AC voltage (S64). As described above with reference to FIG. 1, the AC voltage may be referred to a voltage between the first node N1 and the second node N2. Accordingly, the voltage of the first node N1 may have the same polarity as the AC voltage, whereas the voltage of the second node N2 may have an opposite polarity to that of the AC voltage.

The control circuit 16 may detect a phase of the AC voltage based on the voltage and/or the current of the first node N1 and/or the second node N2 and identify the positive half cycle and a negative half cycle of the AC voltage based on the detected phase. For the positive half cycle of the AC voltage, the control circuit 16 may apply the first voltage, which is relatively low, to the first capacitor C1 so that a voltage between both ends of the first capacitor C1 increase, and apply the second voltage, which is relatively high, to the second capacitor C2 so that a voltage between both ends of the second capacitor C2 increases.

Referring to FIGS. 1 and 10, the second voltage may be applied to the first capacitor C1 for the negative half cycle of the AC voltage (S66), and the first voltage may be applied to the second capacitor C2 for the negative half cycle of the AC voltage (S68). For the negative half cycle of the AC voltage, the control circuit 16 may apply the second voltage, which is relatively high, to the first capacitor C1 so that the voltage between both ends of the first capacitor C1 increases, and apply the first voltage, which is relatively low, to the second capacitor C2 so that the voltage between both ends of the second capacitor C2 increase.

FIG. 11 is a flowchart illustrating in one example a method of providing feedback in wireless power transfer according to embodiments of the inventive concept. More particularly, the flowchart of FIG. 11 illustrates a method supporting multiple operation modes (e.g., a low output mode, a normal output mode, and a high output mode) respectively corresponding to different depths of amplitude modulation. In some embodiments, the method of FIG. 11 may be performed by the control circuit 76 of FIG. 7. Accordingly, the method of FIG. 11 assumes that the first capacitor C12 and the second capacitor C22 of FIG. 7 are auxiliary capacitors.

Referring to FIG. 11, an operation mode is determined (S101). For example, the control circuit 76 or a controller included in the control circuit 76 may determine one of the low output mode, the normal output mode, and the high output mode. The control circuit 76 may determine an operation mode based on various factors. In some embodiments, when power provided from a transmitter does not change even though the feedback information FB has been transmitted to the transmitter in the low output mode (or the normal output mode), the control circuit 76 may estimate that a problem has occurred in the transmission of the feedback information FB, and accordingly, determine the normal output mode (or the high output mode).

Further, a determination is made as to whether the operation mode is the high output mode (S102). If the operation mode is the high output mode (S102=YES), then the method of FIG. 11 may proceed to steps S103 and S104, else if the operation mode is not the high output mode (S102=NO), the method may proceed to step S105.

Thus, if the operation mode is the high output mode (S102=YES), the first voltage and the second voltage may be alternately applied to capacitors and auxiliary capacitors for a first period (S103). For example, in the high output mode, the control circuit 76 may alternately apply the first voltage and the second voltage to the two first capacitors C11 and C12 for the first period. In addition, in the high output mode, the control circuit 76 may alternately apply the second voltage and the first voltage to the two second capacitors C21 and C22 for the first period. Accordingly, an AC voltage may have a greater amplitude in the high output mode than in the low output mode or the normal output mode. Then, the capacitors and the auxiliary capacitors may be floated for a second period (S104). For example, the control circuit 76 may float all of the two first capacitors C11 and C12 and the two second capacitors C21 and C22 for the second period in the high output mode.

However, if the operation mode is not the high output mode (S120=NO), the auxiliary capacitors may be floated (S105). As described above, the auxiliary capacitors may be used in the high output mode and may not be used in the low output mode and the normal output mode. For example, in the low output mode and the normal output mode, the control circuit 76 may float the first capacitor C12 and the second capacitor C22 as the auxiliary capacitors.

Next, a determination is made as whether the operation mode is the low output mode (S106). If the operation mode is the low output mode (S106=YES), the method may proceed to steps S107 and S108, else if the operation mode is not the low output mode (S106=NO), then the operation mode is the normal output mode and the method may proceed to steps S109 and S110.

Thus, if the operation mode is the low output mode (S106=YES), the first voltage may be applied to the capacitors for the first period (S107). For example, in the low output mode, the control circuit 76 may apply the first voltage to the first capacitor C11 and the second capacitor C21 for the first period. Accordingly, the AC voltage may have a less amplitude in the low output mode than in the normal output mode or the high output mode.

Then, the capacitors may be floated for the second period (S108). For example, in the low output mode, the control circuit 76 may float the first capacitor C11 and the second capacitor C21 for the second period, and accordingly, all the capacitors may be floated together with the auxiliary capacitors (S105).

If the operation mode is the normal output mode (S106=NO), the first voltage and the second voltage may be alternately applied to the capacitors for the first period (S109). For example, in the normal output mode, the control circuit 76 may alternately apply the first voltage and the second voltage to the first capacitor C11 for the first period. In addition, in the normal output mode, the control circuit 76 may alternately apply the second voltage and the first voltage to the second capacitor C21 for the first period. Accordingly, the AC voltage may have a greater amplitude in the normal output mode than in the low output mode and have a less amplitude in the normal output mode than in the high output mode.

Then, the capacitors may be floated for the second period (S110). For example, in the normal output mode, the control circuit 76 may float the first capacitor C11 and the second capacitor C21 for the second period, and accordingly, all the capacitors may be floated together with the auxiliary capacitors (S105).

While the inventive concept has been particularly shown and described with reference to embodiments thereof, it will be understood that various changes in form and details may be made therein without departing from the scope of the inventive concept as defined by the following claims.

What is claimed is:

1. A first device wirelessly receiving power from a second device including a second resonance circuit having a resonance frequency, the first device comprising:
   a first resonance circuit having the resonance frequency;
   a first capacitor connected to the first resonance circuit at a first node;
   a rectifier configured to rectify an alternating current (AC) voltage apparent at the first node and oscillating at the resonance frequency; and
   a control circuit connected to the first capacitor, and configured to determine a first period based on feedback information to be provided to the second device, and alternately apply a first voltage and a second voltage higher than the first voltage to the first capacitor for the first period during a normal output mode.

2. The first device of claim 1, wherein the control circuit is further configured to determine a second period based on the feedback information and float the first capacitor for the second period.

3. The first device of claim 2, wherein the control circuit is further configured to encode the feedback information and determine the first period and the second period based on an encoded bit resulting from encoding of the feedback information.

4. The first device of claim 1, wherein the control circuit is further configured to apply the first voltage to the first capacitor for a positive half cycle of the AC voltage, and apply the second voltage to the first capacitor for a negative half cycle of the AC voltage.

5. The first device of claim 1, wherein the control circuit is further configured to apply the first voltage to the first capacitor for the first period during a low output mode.

6. The first device of claim 1, further comprising:
   a second capacitor connected between the first node and the control circuit,
   wherein the control circuit is further configured to float the second capacitor during the normal output mode and alternately apply the first voltage and the second voltage to the first capacitor and the second capacitor for the first period during a high output mode.

7. The first device of claim 1, further comprising:
   a third capacitor connected to the first resonance circuit at a second node,
   wherein the control circuit is further configured to alternately apply the second voltage and the first voltage to the third capacitor for the first period.

8. The first device of claim 1, wherein the first voltage is ground potential, and the second voltage is a voltage rectified from the AC voltage by the rectifier.

9. The first device of claim 1, further comprising:
   a direct current (DC) voltage generator configured to generate a DC voltage from a voltage rectified from the AC voltage by the rectifier,
   wherein the first voltage is ground potential, and the second voltage is the DC voltage.

10. The first device of claim 9, wherein the DC voltage generator is further configured to adjust a magnitude of the DC voltage in response to a control signal, and
    the control circuit is further configured to generate the control signal in response to an operation mode.

11. The first device of claim 1, wherein the control circuit is further configured to receive an external voltage independent of the AC voltage, the first voltage is ground potential, and the second voltage is the external voltage.

12. A method performed by a first device wirelessly receiving power from a second device including a second resonance circuit having a resonance frequency, the method comprising:
    rectifying an alternating current (AC) voltage generated by a first resonance circuit having the resonance frequency;
    determining a first period and a second period based on feedback information to be provided to the second device;
    alternately applying a first voltage and a second voltage higher than the first voltage to a first capacitor connected to the first resonance circuit for the first period; and
    floating the first capacitor for the second period.

13. The method of claim 12, wherein the determining of the first period and the second period includes:
    encoding the feedback information; and
    determining the first period and the second period based on at least one encoded bit resulting from the encoding of the feedback information.

14. The method of claim 12, wherein the alternately applying of the first voltage and the second voltage includes:
    applying the first voltage to the first capacitor for a positive half cycle of the AC voltage; and
    applying the second voltage to the first capacitor for a negative half cycle of the AC voltage.

15. The method of claim 12, wherein the alternately applying of the first voltage and the second voltage is performed during a normal output mode, and includes applying the first voltage to the first capacitor for the first period during a low output mode.

16. The method of claim 12, further comprising:
    floating a second capacitor connected to the first resonance circuit during a normal output mode; and
    alternately applying the first voltage and the second voltage to the second capacitor for the first period during a high output mode.

17. A first device wirelessly receiving power from a second device including a second resonance circuit having a resonance frequency, the first device comprising:
    a first resonance circuit having the resonance frequency;
    a first capacitor connected to the first resonance circuit at a first node;
    a second capacitor connected to the first resonance circuit at a second node;
    a first switch connected to the first capacitor;
    a second switch connected to the second capacitor; and
    a controller configured to alternately apply a first voltage and a second voltage higher than the first voltage to the first capacitor and the second capacitor by controlling the at least one of the first switch and the second switch.

18. The first device of claim 17, wherein the controller is further configured to determine a first period and a second period based on feedback information provided to the second device, and control the at least one of the first switch and the second switch so that the first voltage and the second voltage are applied to the first capacitor and the second capacitor for the first period and the first capacitor and the second capacitor are floated for the second period.

19. The first device of claim 17, further comprising:
a rectifier configured to rectify an alternating current (AC) voltage apparent at the first node and the second node and oscillating at the resonance frequency,
wherein the first voltage is ground potential, and
the second voltage is one of a voltage rectified by the rectifier, a direct current (DC) voltage generated from the rectified voltage, and an external voltage independent of the AC voltage.

20. The first device of claim 17, further comprising:
a third capacitor connected to the first node;
a fourth capacitor connected to the second node;
a third switch connected to the third capacitor; and
a fourth switch connected to the fourth capacitor,
wherein the controller is further configured to alternately apply the first voltage and the second voltage to the third capacitor and the fourth capacitor by controlling the at least one of the third switch and the fourth switch.

\* \* \* \* \*